G. N. SMITH.
BAKING IRON.
APPLICATION FILED NOV. 2, 1909.
977,141.
Patented Nov. 29, 1910.
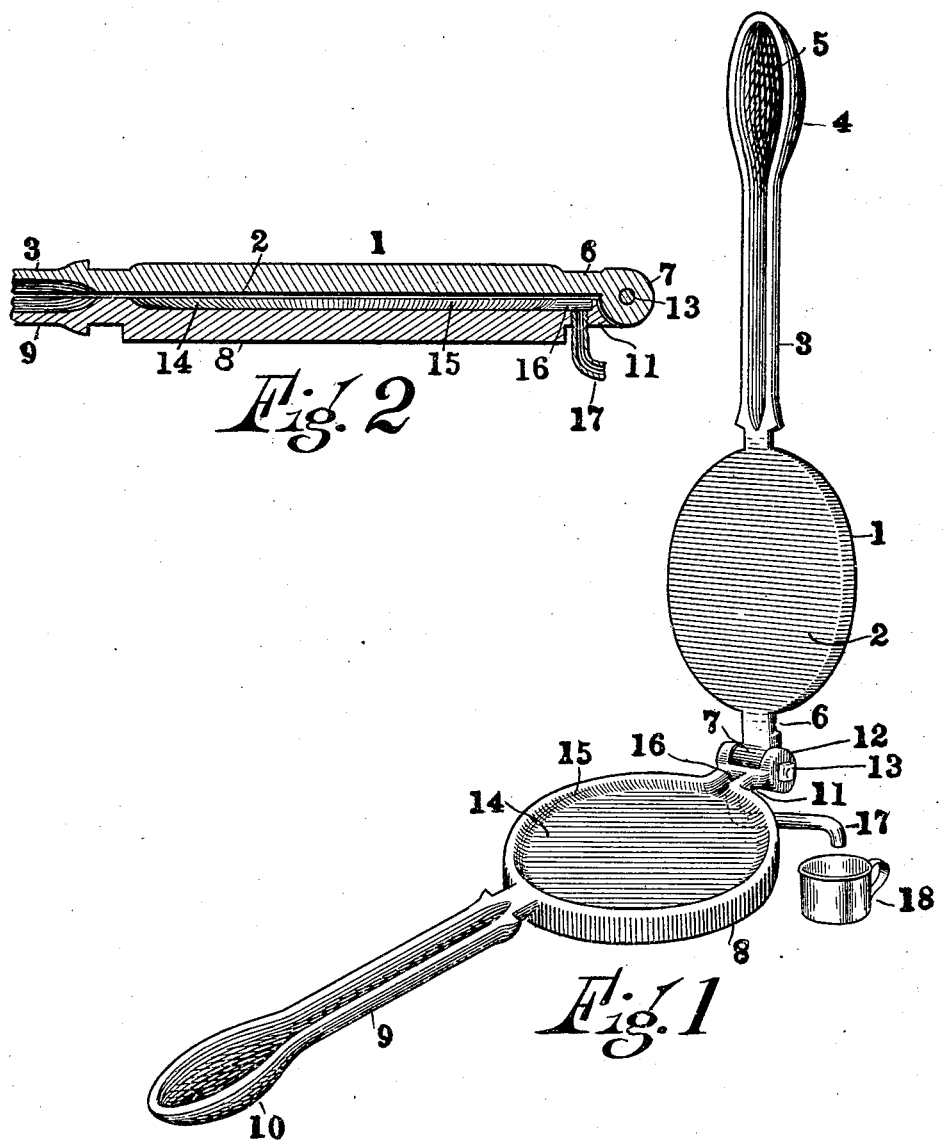
Witnesses:
Austin B. Hanscom
Glenara Fox
INVENTOR—
George N. Smith,
By C. E. Humphrey
ATTORNEY.

UNITED STATES PATENT OFFICE.

GEORGE N. SMITH, OF AKRON, OHIO.

BAKING-IRON.

977,141. Specification of Letters Patent. Patented Nov. 29, 1910.

Application filed November 2, 1909. Serial No. 525,952.

*To all whom it may concern:*

Be it known that I, GEORGE N. SMITH, a citizen of the United States, residing at Akron, in the county of Summit and State of Ohio, have invented new and useful Improvements in Baking-Irons, of which the following is a specification.

This invention relates to cooking irons and the object thereof is to provide a device for the ready cooking of small portions of food such as Hamburg steak or sausage for use in restaurants where quick lunches in the shape of hot sandwiches are served, and the device is also adapted for cooking eggs or other articles.

The invention contemplates providing a cooking iron comprising hinged companion members, which under ordinary circumstances, is kept heated and wherein small portions of food may be quickly prepared.

A further object of the invention is to provide a suitable drain for the iron to carry away the grease or fat exuded from the food during the cooking thereof, said drain conveying the grease or fat away from dangerous proximity to the flame into a suitable receptacle.

A still further object of the invention is to make a strong, safe, simple and effective device capable of accomplishing the foregoing objects and one in which the number of parts is reduced to a minimum to provide as effective and perfect an article as possible.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings, in which similar reference numerals indicate like parts in the different figures: Figure 1 is a perspective view of my device; and, Fig. 2 a longitudinal, sectional view of the same with portions of the handles broken away.

Referring to the drawings, the device embodies an upper member having a body portion 1, preferably provided with a smooth lower face. Projecting from the body portion 1 is a handle 3 terminating in an enlarged end 4, preferably semi-ovoid in form, said handle 3 and its enlarged end both provided with a recess 5 to reduce the conduction of heat from the body portion 1 of the iron to the handle. Preferably extending from the opposite side of the body portion 1 is a flat lug 6 provided with an enlarged cylindrical end 7 transversely apertured, constituting one member of a hinge. The coöperating member of the cooking iron comprises a body portion 8 provided with a handle 9 having an enlarged end 10, said handle 9 and enlarged end 10 constructed similarly to the handle 3. The body portion 8 is further provided with a forwardly-projecting lug 11 having its outer terminus off-set at each end and integral with each of said off-sets is an apertured ear 12. The ears 12 are arranged in parallelism with respect to each other and extending between said ears is the enlarged cylindrical end 7 of the lug 6. Extending through the end 7 and the ears 12 is a bolt 13 for connecting the lug 6 to the lug 11 and the said ears 12 constitute the other member of the hinge hereinbefore referred to. In the upper face of the member 8 is a wide shallow recess 14, inclosed by an upwardly-extending flange 15, the inner wall of which is inwardly-inclined or formed upon curvilinear lines, as shown in the drawings, to remove any chance of a sharp angle being formed between the inner wall of the flange and the floor of the recess into which fat or grease can accumulate. Formed in the upper face of the lug 11 is a groove 16 of less length than the length of the lug and into which the grease and fat from the recess 14 may pass. The groove 16 at its inner end communicates with the recess 14 and at its outer end opens into a drain pipe 17. The lug 11 at its outer end is provided with an upwardly-extending threaded aperture communicating with the bottom of the groove 16. Mounted in this threaded aperture is the upper end of a drain-pipe 17 by which the grease and fat passing from the recess 14 into the groove 16 is carried to a suitable receptacle 18, preferably positioned some distance from the flame by which the device is heated. When not in use the upper member of the iron is swung downwardly and the device closed, thus both members of the iron are kept heated for instant use. In use the upper member is raised and the food to be cooked is placed in the recess 14 and usually smoothed or spread evenly over the surface thereof, after which the iron is closed.

If the food is of a nature requiring grease to properly cook the same, it is placed in the recess 14 previous to the placing of the food therein. All surplus grease or fat accumulating during the cooking of the food is carried outwardly through the groove 16 into the drain 17 to the receptacle 18. As soon as the food has been placed in the recess 14 the upper member is lowered and as this member has been previously thoroughly heated, the food contained in the recess is cooked with great rapidity and a desired shape or form is imparted thereto, the iron constituting to a certain extent a mold for this purpose.

Experience has thoroughly demonstrated that such articles as thin Hamburg steaks for use in sandwiches and similar articles of food may be cooked in one or two minutes with this device and it may also be used for cooking eggs, when if a customer desires an egg "turned" the upper member is brought down to close the iron; but if no turning is desired, the egg may be cooked in the recess 14 without closing the iron.

It is not necessary at any time to invert the lower member as it is kept constantly over a suitable flame to be ready for instant use.

What I claim and desire to secure by Letters Patent, is:—

A cooking utensil comprising a pair of members each provided with a body-portion and one adapted to be mounted upon the other and each formed with a laterally-extending hollow handle section projecting from its respective body-portion, one of said body-portions having its inner face provided with a shallow recess and the other having its inner face flat throughout, a lateral lug projecting from said recessed body-portion and having its upper face provided with a groove of less length than the length of the lug and which opens at its inner end into the recess of the body-portion, apertured ears projecting from the outer terminus of said lug, a lateral lug projecting from the other of the body-portions and having an enlarged cylindrical end extending between said ears, means for pivotally connecting the ears and cylindrical end together, and an outlet means for said groove at the outer end of the latter.

In testimony whereof I have hereunto set my hand in presence of two subscribing witnesses.

GEORGE N. SMITH.

Witnesses:
WM. H. EVANS, Jr.,
C. E. HUMPHREY.